United States Patent
Rubenson et al.

(10) Patent No.: US 6,510,048 B2
(45) Date of Patent: Jan. 21, 2003

(54) KEYBOARD ARRANGEMENT

(75) Inventors: Benjamin Cory Rubenson, San Diego, CA (US); Harold J. Welch, San Jose, CA (US); Stephen Zadesky, Redwood City, CA (US); David Lundgren, Mill Valley, CA (US)

(73) Assignee: Apple Computer, Inc., Cupertino, CA (US)

( * ) Notice: Subject to any disclaimer, the term of this patent is extended or adjusted under 35 U.S.C. 154(b) by 128 days.

(21) Appl. No.: 09/755,625

(22) Filed: Jan. 4, 2001

(65) Prior Publication Data

US 2002/0085337 A1 Jul. 4, 2002

(51) Int. Cl.⁷ .............................. G06F 1/16; H05K 7/00
(52) U.S. Cl. ...................... 361/680; 361/383; 400/682
(58) Field of Search .............................. 361/680, 683, 361/686, 681; 400/682, 691, 692, 693, 488, 489, 82; 312/223.1, 223.2; 341/22; 345/168

(56) References Cited

U.S. PATENT DOCUMENTS

| | | | |
|---|---|---|---|
| 4,903,222 A | | 2/1990 | Carter et al. |
| 5,153,589 A | | 10/1992 | Heys, Jr. et al. |
| 5,175,672 A | * | 12/1992 | Connor et al. ............... 361/680 |
| 5,287,245 A | | 2/1994 | Lucente et al. |
| 5,331,508 A | | 7/1994 | Hosoi et al. |
| 5,335,141 A | | 8/1994 | Hosoi |
| 5,443,320 A | | 8/1995 | Agata et al. |
| 5,490,037 A | | 2/1996 | Clancy |
| 5,546,334 A | | 8/1996 | Hsieh et al. |
| 5,646,820 A | * | 7/1997 | Honda et al. ............... 361/683 |
| 5,966,284 A | | 10/1999 | Youn et al. |
| 6,064,564 A | | 5/2000 | Song et al. |

* cited by examiner

Primary Examiner—Darren Schuberg
Assistant Examiner—Lisa Lea-Edmonds
(74) Attorney, Agent, or Firm—Beyer Weaver & Thomas, LLP

(57) ABSTRACT

The invention generally pertains to a computing device. More particularly, the invention pertains to an improved keyboard arrangement for use in the computing device. One aspect of the invention pertains to a movable keyboard that can be opened or removed to gain easy access to internal components of the computing device. Another aspect of the invention pertains to a magnetic keyboard securing system suitable for holding the movable keyboard relative to the computing device. The invention is particularly useful in computing devices such as portable computers.

28 Claims, 6 Drawing Sheets

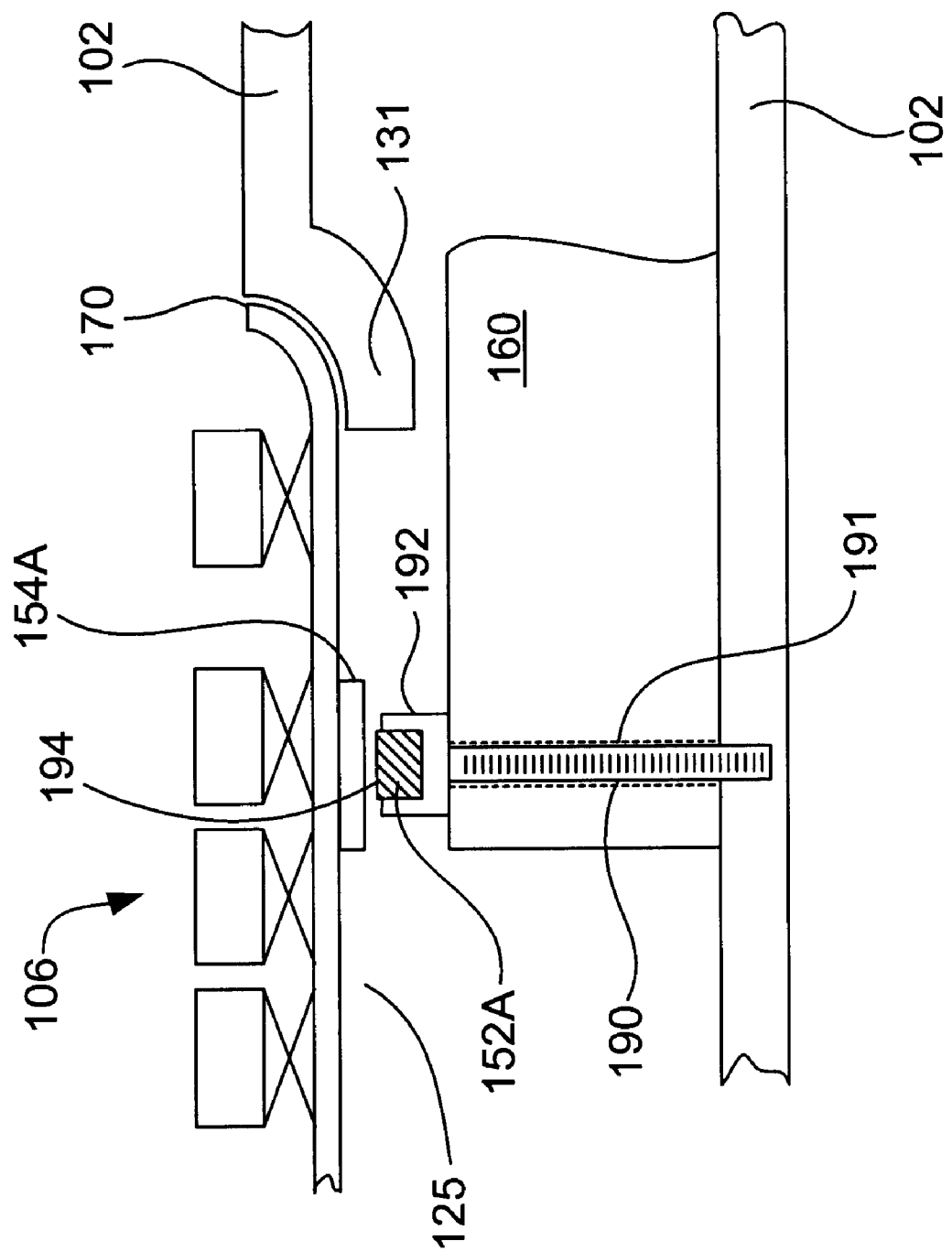

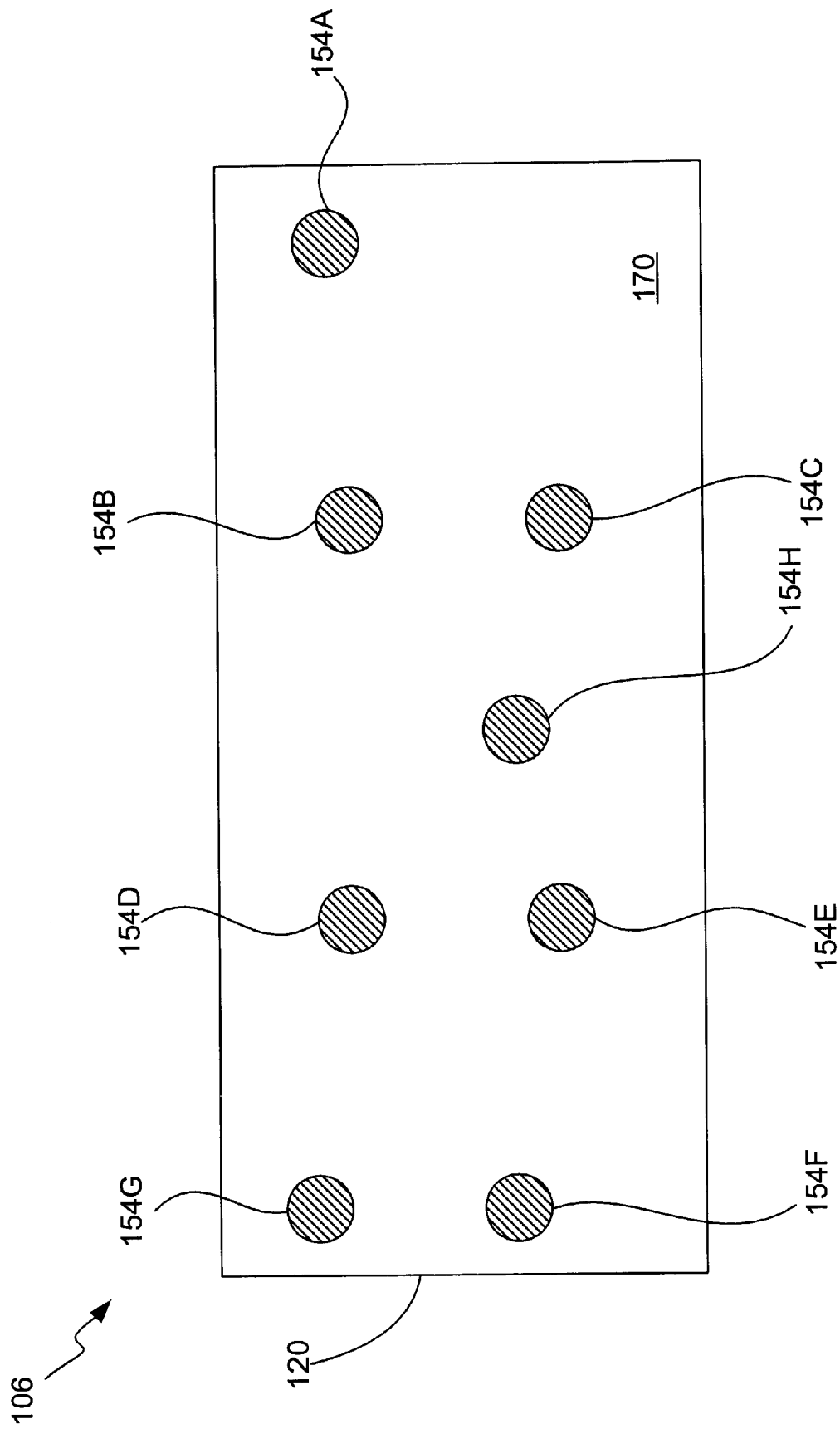

KEYBOARD ARRANGEMENT

BACKGROUND OF THE INVENTION

The present invention relates generally to a computer device. More particularly, the present invention relates to a keyboard arrangement for use in a computer device.

In recent years portable computers have become thin, light and powerful. One factor contributing to this phenomena is in the manufacturer's ability to fabricate various components of the computer in smaller and smaller sizes while in most cases increasing the power and or operating speed of such components.

The trend of thinner, lighter and powerful presents a continuing design challenge in the design of some components associated with the portable computer. For example, one design challenge associated with the portable computer is the design of the keyboard structure used in portable computers. This design challenge generally arises from two conflicting design goals—the desirability of making the keyboard structure lighter and thinner, and the desirability of having a portable computer keyboard emulate as closely as possible the size and typing "feel" of a desktop computer keyboard. Typing "feel" is generally defined herein as the feeling a user gets when typing on the keyboard, i.e., pressing on the keys with fingers. As should be appreciated, the thinner and lighter portable keyboard structure is more flexible than the robust desktop keyboard structure and thus it has a greater propensity to buckle and bow when used. Unfortunately, the buckling and bowing typically leads to user dissatisfaction, i.e., the portable keyboard structure does not emulate the strong and firm typing feel of the desktop computer keyboard, and may damage other parts of the portable computer such as the display screen.

Another design challenge in the design of portable computers is in techniques for providing access to the electrical components housed within the casing of the portable computer. One conventional technique includes disassembling the portable computer casing. Unfortunately, this technique may lead to problems. For example, such disassembly is typically unworkable for users of the portable computers who often lack time, tools and skills to perform the disassembly. Another conventional technique includes providing trap doors, which are typically built into the casing. This technique may also lead to problems. For example, trap doors generally complicate the housing design of the portable computer, reduce the strength of the casing because of the opening created for the trap door, and create aesthetic difficulties because of undesirable cracks and fasteners positioned along surfaces of the casing.

Thus, there is a need for an improved keyboard arrangement for use in a computer device such as a portable computer.

SUMMARY OF THE INVENTION

The invention relates, in one embodiment, to a computer. The computer includes a housing. The computer also includes a keyboard that is detachable from the housing. The computer further includes a magnetic keyboard securing system for holding the keyboard relative to the housing.

The invention relates, in another embodiment, to a computer device. The computer device includes a housing. The computer device also includes a keyboard that is movable relative to the housing. The computer device further includes a means for magnetically attaching the keyboard to the housing.

The invention relates, in another embodiment, to a portable computer. The portable computer includes a base having an opening for allowing access to a component enclosed within the base. The portable computer further includes a removable keyboard having a base plate configured for placement within the opening. The portable computer additionally includes a permanent magnet fixedly coupled to either the base or a structural component enclosed within the base. The portable computer also includes a metal disk fixedly coupled to the base plate. The magnetic element and the magnetic surface are cooperatively positioned so that when the removable keyboard is placed within the opening, the permanent magnet and metal disk are magnetically attracted to one another thus clamping the removable keyboard to the base.

The invention relates, in another embodiment, to a method for holding a removable keyboard within an opening disposed in a base of a portable computer. The method includes providing a magnetic element and a magnetic surface. The method also includes magnetically attracting the magnetic surface towards the magnetic element so as to magnetically secure the keyboard within the opening of the base.

BRIEF DESCRIPTION OF THE DRAWINGS

The invention may best be understood by reference to the following description taken in conjunction with the accompanying drawings in which:

FIG. 5 depicts a side view, in cross section, of the base of the portable computer shown in FIG. 3 (taken along line 5–5'), in accordance with one embodiment of the present invention.

FIG. 6 depicts a bottom view of the keyboard shown in FIG. 2, in accordance with one embodiment of the present invention.

DETAILED DESCRIPTION OF THE INVENTION

The invention generally pertains to a computing device. More particularly, the invention pertains to an improved keyboard arrangement for use in the computing device. One aspect of the invention pertains to a movable keyboard that can be opened or removed to gain easy access to internal components of the computing device. Another aspect of the invention pertains to a magnetic keyboard securing system suitable for holding the movable keyboard relative to the computing device. The invention is particularly useful in computing devices such as portable computers.

Embodiments of the invention are discussed below with reference to FIGS. 1–6. However, those skilled in the art will readily appreciate that the detailed description given herein with respect to these figures is for explanatory purposes as the invention extends beyond these limited embodiments.

Figure 1:
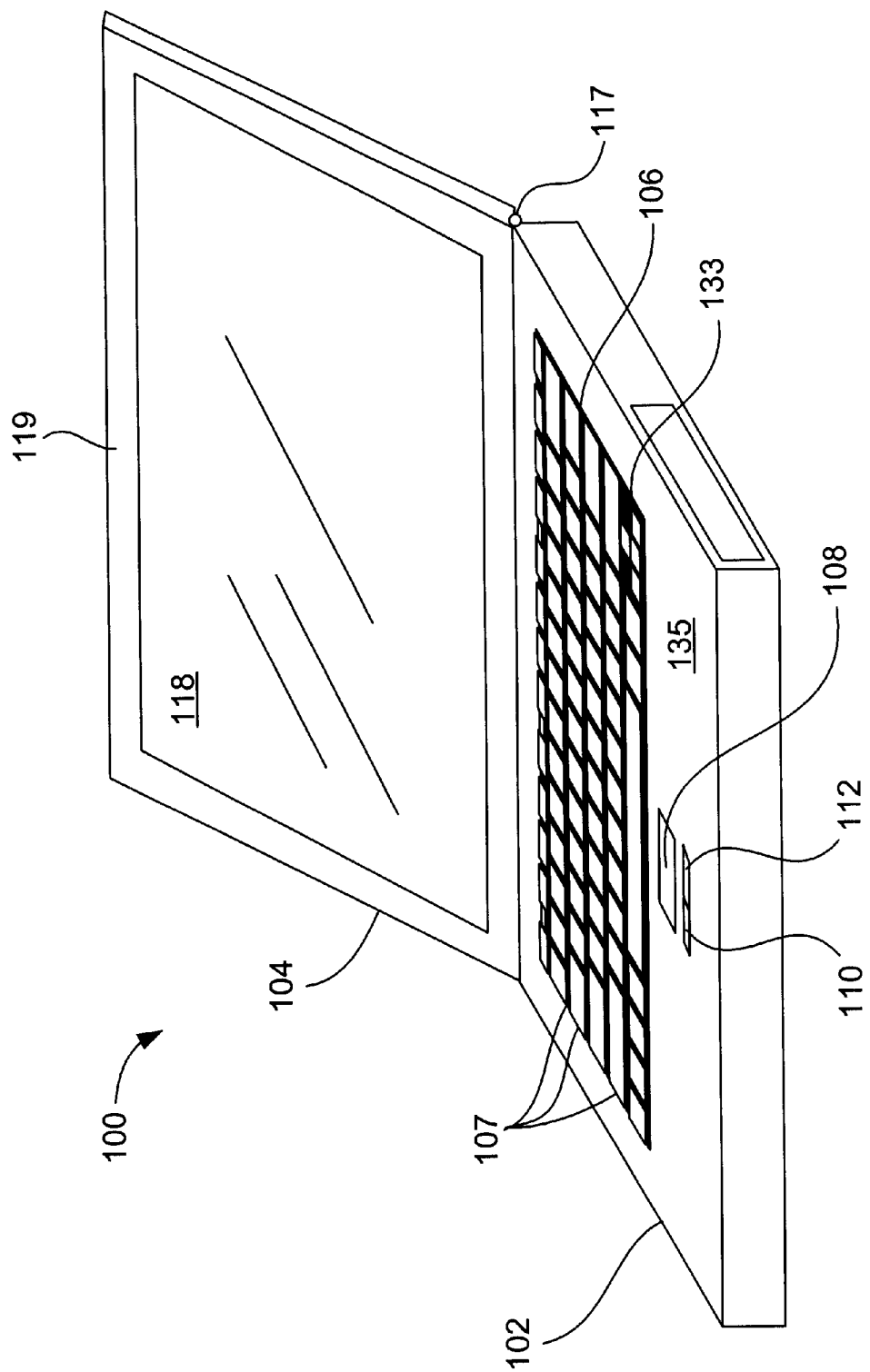
FIG. 1 is a perspective diagram of a portable computer, in accordance with one embodiment of the present invention.

FIG. 1 is a perspective diagram of a portable computer 100, in accordance with one embodiment of the invention. The portable computer 100 generally includes a base 102 and a lid 104. The base 102 is configured to enclose various integrated circuit chips and other circuitry that provide computing operations for the portable computer 100. By way of example, the integrated circuit chips and other circuitry may include a microprocessor, Read-Only Memory (ROM), Random-Access Memory (RAM), a disk drive, a battery, and various input/output support devices. The base 102 is also arranged to hold a plurality of input devices such as a keyboard 106, a track pad 108 and buttons 110 & 112. The keyboard 106, which includes a plurality of keys 107, allows a user of the portable computer 100 to enter alpha-numeric data. The track pad 108 allows a user to move an input pointer on a graphical user interface. Buttons 110 and 112 allow a user to make a selection on the graphical user interface. As shown, the track pad 108 and buttons 110 & 112 are located in a front area (or palm rest) of the base 102, and the keyboard 106 is located in a back area of the base 102.

Figure 2:
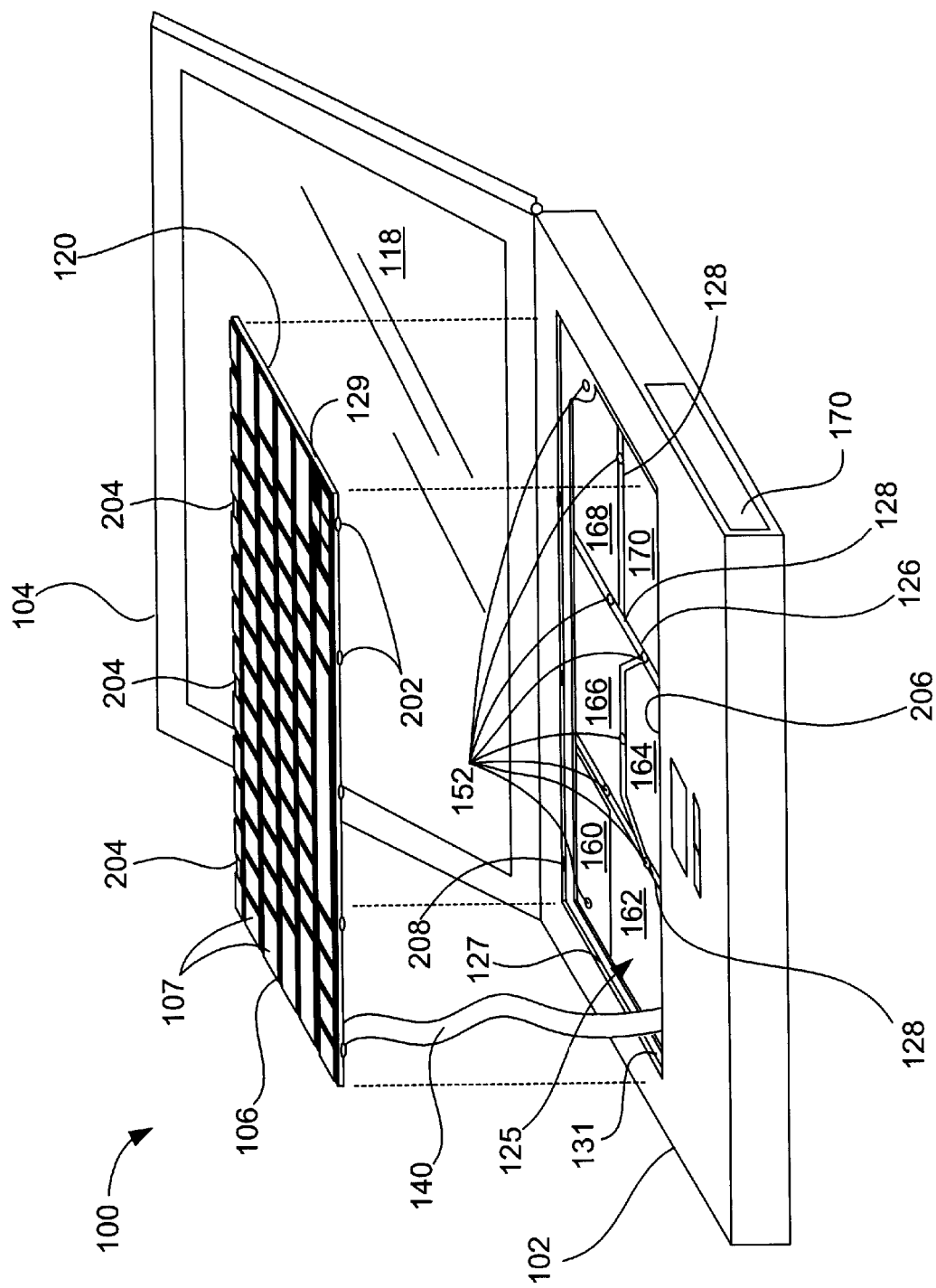
FIG. 2 is a perspective diagram of a portable computer with a movable keyboard, in accordance with one embodiment of the present invention.

The lid 104 is pivotally coupled to the base 102 via a hinge mechanism 117. As such, the lid 104 may rotate into an open position (as shown in FIGS. 1 and 2) or a closed position relative to the base 102 (not shown). The lid 104 generally contains a liquid crystal display (LCD) 118 that is used to display the graphical user interface (including perhaps a pointer or cursor) as well as other information to the user. The LCD display 118 is generally surrounded at a peripheral region by a bezel 119 that serves to support the LCD display 118 in its assembled position within the lid 104. As should be appreciated, the LCD display 118 is visible to a user of the portable computer 100 when the lid 104 is in the open position and no longer visible to the user when the lid 104 is in a closed position.

In accordance with one aspect of the present invention, the keyboard 106 is arranged to be a modular unit that is movable relative to the base 102. That is, the keyboard 106 is movable such that it can be coupled to and/or de-coupled from the base 102. In one embodiment, the movable keyboard is arranged to act as a trap door that covers an opening in the base. The opening allows user access to various internal components enclosed inside the base. As such, the keyboard 106 is adapted to move between a mounting condition, which secures the keyboard to the base and which prevents access through the opening, and a removal condition, which enables removal of the keyboard from the base and which allows access through the opening. The movability of the keyboard 106 is described in detail below.

FIG. 2 is a perspective diagram of the portable computer 100 showing the movable keyboard 106 arranged away from the base 102 of the portable computer 100, in accordance with one embodiment of the present invention. As shown, the base 102 includes an opening 125 that is adapted for receiving the movable keyboard 106. The opening 125 is arranged to allow access to various internal components of the portable computer 100 when the movable keyboard 106 is moved away from the opening 125. By way of example, the opening 125 may allow an operator of the portable computer 100 to upgrade internal components such as a modem, memory, hard drive and/or the like. As seen through the opening 125, the base 102 also encloses a frame 126 for rigidly supporting the base 102. The frame 126 generally includes a plurality of ribs 128 that are attached to the base 102 and that extend in multiple directions. In addition and by way of example, a modem 160, a PC card 162, RAM 164, a fan 166, a heat sink 168 and a DVD drive 170, may also be seen through the opening 125. These components are typically placed within open areas formed between the plurality of ribs 128.

Figure 4:
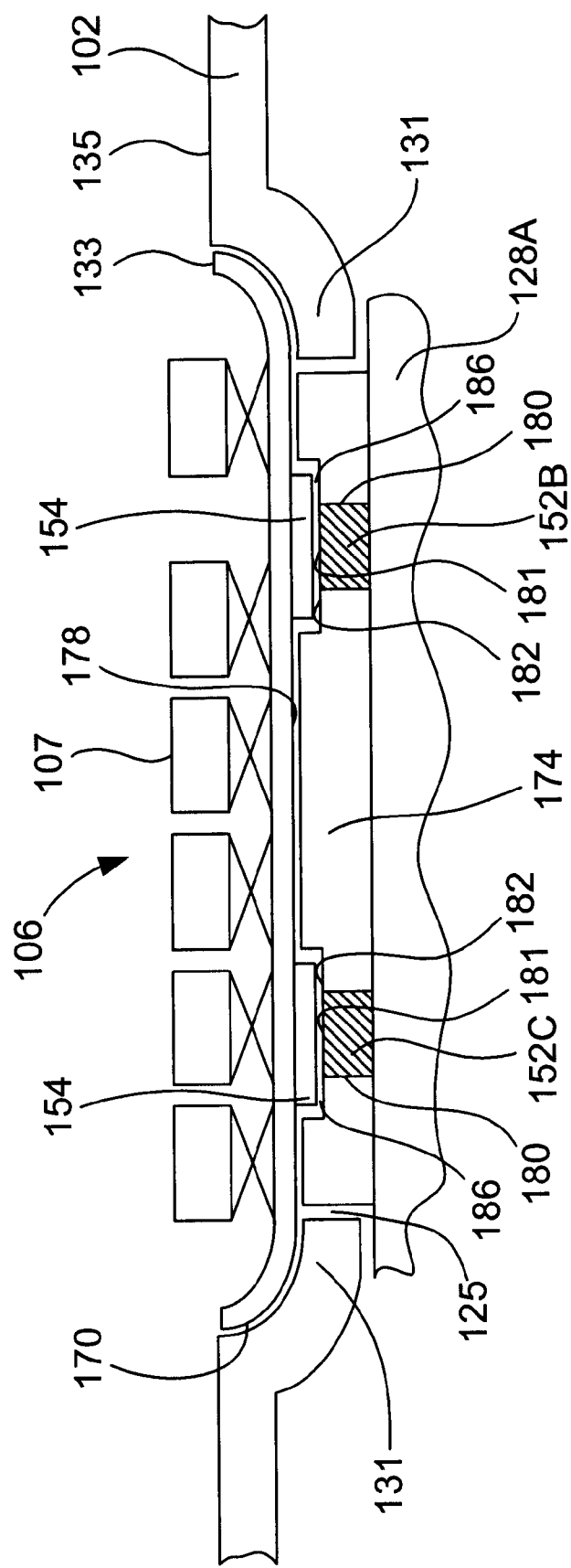
FIG. 4 depicts a side view, in cross section, of the base of the portable computer shown in FIG. 3 (taken along line 4–4'), in accordance with one embodiment of the present invention.

The movable keyboard 106 generally includes a bottom plate 120 for supporting the plurality of keys 107. In most cases, the keys 107 are movably coupled to the bottom plate 120 via a low profile mechanism (not shown). The bottom plate 120 is configured for placement within the opening 125. For example, the shape of the opening 125 typically coincides with the shape of the bottom plate 120. In one embodiment, the opening 125 has an inner peripheral surface 127 that is configured to mate with an outer peripheral surface 129 of the bottom plate 120 when the keyboard is placed within the opening 125. The base 102 also includes a recessed lip 131 for supporting a bottom edge of the bottom plate 120 when the movable keyboard 106 is placed within the opening 125. As shown, the lip 131 extends into the opening 125 past the inner peripheral surface 127. In most cases, the recessed lip 131 is configured to position a top surface 133 of the bottom plate 120 substantially flush with a top surface 135 of the base 102 (as shown in FIGS. 1 & 4). The position of the movable keyboard 106 within the opening 125 is also arranged with respect to the LCD screen 118 so as to provide a gap between the top portion of the keys 107 and the surface of the LCD screen when the lid 104 is closed. This is typically done to prevent damage to the LCD screen.

To elaborate further, the movable keyboard 106 may be operatively coupled to the internal components of the portable computer 100 via a group of data transmission wires 140 (e.g., a ribbon cable). The data transmission wires 140 may be configured to allow the movable keyboard 106 to be removed and moved a substantial distance away from the portable computer 100. In other words, the keyboard 106 can be completely removed from the opening 125 of the base 102. If desired, the movable keyboard 106 can be completely disconnected from the data transmission wires 140. Alternatively, the movable keyboard 140 may, for example, be movably coupled to the base 102 through rotation about a hinge (not shown). When the movable keyboard 106 is rotated about the hinge, the keyboard 106 is largely removed from the opening 125 of the base 102 except for the portion at the hinge. In any event, however, the movable keyboard 106 is typically connected to the base 102 during use of the movable keyboard 106 (as shown in FIG. 1).

In accordance with another aspect of the present invention, a magnetic keyboard securing system is provided to hold the movable keyboard 106 relative to the base 102. The magnetic keyboard securing system generally includes a metallic surface and a magnet for magnetically clamping the movable keyboard to the base. In one embodiment, the metallic surface is attached to the bottom surface of the bottom plate and the magnet is attached directly or indirectly to the base. By way of example, the magnet may be attached to the base itself, to the frame that supports the base, or to some other component that is connected to the frame or the base. In this embodiment, the magnet and metallic surface are cooperatively positioned so that when the keyboard is placed within the opening, the magnet and metallic surface are magnetically attracted (or drawn) to one another thus clamping the moveable keyboard to the base. As should be appreciated, this particular feature allows the movable keyboard to be easily removed and reattached while holding the keyboard down during use of the keyboard. By holding down, it is meant that the keyboard is held within the opening and that the keyboard is substantially prevented from buckling or bowing.

Referring to FIGS. 2–6, the magnetic keyboard securing system 150 will be described in greater detail. As shown in these figures, the magnetic keyboard securing system 150 includes a plurality of magnets 152 and a plurality of metallic surfaces 154. As mentioned, the magnets 152 and metallic surfaces 154 are cooperatively positioned so that when the keyboard 106 is placed within the opening 125, the magnets 152 and metallic surfaces 154 are magnetically attracted (or drawn) to one another thus clamping the moveable keyboard 106 to the base 102.

Figure 3:
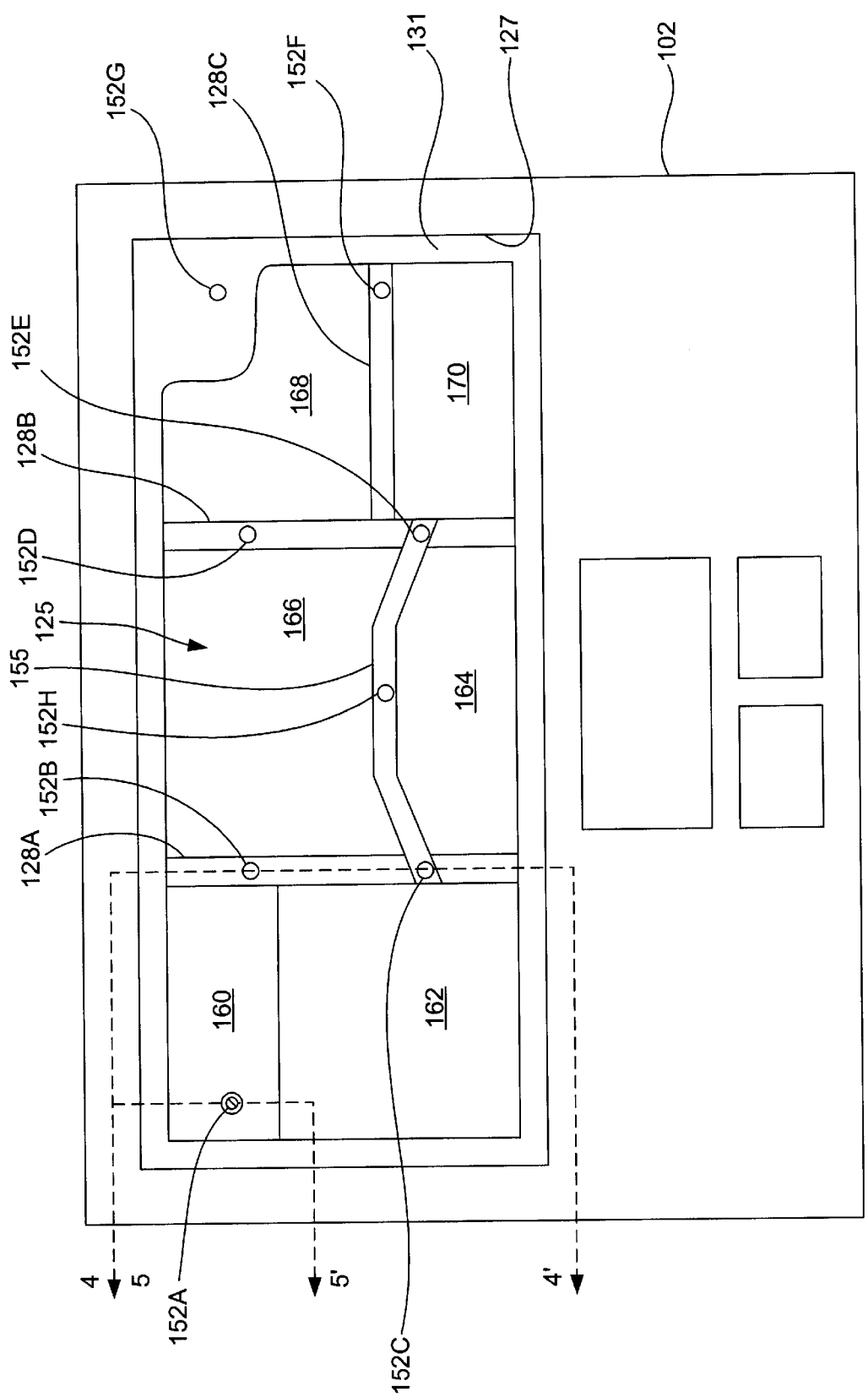
FIG. 3 depicts a top view of the base of the portable computer shown in FIG. 2, in accordance with one embodiment of the present invention.

FIG. 3 is a top view diagram of the base 102 with the keyboard 106 removed from the opening 125, in accordance with one embodiment of the invention. As shown, the magnets 152 are positioned throughout the base 102 and within the opening 125. In most cases, they are placed strategically to hold the bottom plate 120 down where it's most likely to bow. That is, they are placed so as to maintain a certain amount of bottom plate flatness during use of the keyboard 106. In the illustrated embodiment, eight magnets are used. However, it should be noted that this is not a limitation and the amount of magnets typically depends on several factors including the strength, size and weight of the magnets as well as the limited locations for magnet attachment. It is generally believed that the greater the strength of the magnets or the greater the number of magnets, the greater the holding force between the bottom plate 120 and the base 102. If the force is too great, however, the bottom plate 120 may bend when removing the keyboard 106 from the opening 125. Thus, the strength of the magnets should be configured to hold or secure the keyboard 106 down, but not to the point of bending upon removal.

It has generally been found that certain locations are preferable. For example, it is preferable to place the magnets in locations that are proximate highly used keys. In one implementation, a magnet is positioned proximate the space bar. In another implementation, a magnet is positioned proximate the delete key. Furthermore, it has generally been found that the corners of the keyboard incur the most bowing. As such, it is also preferable to place magnets proximate the corners of the keyboard.

Still referring to FIG. 3, the magnets 152 are attached to various components housed within the base 102. For example, a first magnet 152A is attached to the modem 160, second and third magnets 152B and 152C are attached to a first rib 128A, fourth and fifth magnets 152D and 152E are attached to a second rib 128B, a sixth magnet 152F is attached to a third rib 128C, a seventh magnet 152G is attached to the heat sink 168, and an eighth magnet 152H is attached to a magnetic support bar 155. The magnetic support bar 155 is arranged to provide a surface for attachment where there is not one normally. As shown, the magnet support bar 155 extends from one rib to another. In the illustrated embodiment, the magnet support bar 155 is arranged to position the eighth magnet 152H proximate the center of the keyboard 106. Like the corners, the center of the keyboard 106 is also susceptible to bowing. In most cases, the magnet support arm 155 is formed from a suitably rigid material. By way of example, certain kinds of rigid and light weight plastics may be used.

FIG. 4 is a side elevation view of the base 102 and the keyboard 106 (taken along 4–4' as indicated in FIG. 3), in accordance with one embodiment of the invention. As shown, the keyboard 106 is positioned within the opening 125 of the base 102. As such, an outer edge 170 of the bottom plate 120 is seated in the recessed lip 131 of the base 102. The lip 131 provides surfaces for positioning and supporting the keyboard 106 relative to the base 102. In one embodiment, the bottom plate 120 has curved or rolled edges 170 so as to increase the rigidity (i.e., reduced flexibility) of the bottom plate 120. As such, the lip 131 is also curved so that the bottom plate 120 can seat properly with the base 102. In most cases, the bottom plate 120 is formed from a suitably thin structural material. By way of example, stainless steel having a thickness between about 0.15 mm and about 0.3 mm, and more particularly about 0.2 mm may be used. Stainless spring stock may be used because of its flexibility, i.e., it can retain its shape after bending.

Furthermore, the rib 128 includes an upper portion 174 that extends upwards to about the bottom surface 178 of the bottom plate 120. This is done to further support the keyboard 106 relative to the base 102. That is, the upper portion 174 prevents the bottom plate 120 from deflecting or bowing downwards when pressure is applied to the keyboard 106 as for example when a user presses on one of the keys 107. In one embodiment, the upper portion 174 extends as high as possible without bowing the keyboard 106 upwards when the keyboard 106 is placed in the opening 125. In fact, a tolerance gap may provided to soak up tolerances found between the bottom surface 178 of the bottom plate 120 and the upper portion 174 of the rib 128, i.e., the keyboard might be manufactured so that when its placed on the ribs it bows up.

Still referring to FIG. 4, the magnetic keyboard securing system 150 includes magnets 152 and metallic surfaces 154 that work together to hold the keyboard 106 against the base 102. As shown, the metallic surfaces 154 are attached to the bottom surface 178 of the bottom plate 120, and the magnets 152 are attached to the rib 128 of the base 102. Further, the metallic surfaces 154 are disposed over the magnets 152 when the keyboard 106 is placed in the base 102. As such, the bottom plate 120 is drawn to the rib 128 via the magnet/metallic surface combination when the keyboard 106 is placed in the opening 125 of the base 102. As should be appreciated, the magnetic drawing action not only holds the base plate 120, but it also prevents upward deflections of the base plate 120, i.e., bowing upwards.

To elaborate further, the metallic surfaces are generally low profile disks, which are formed from a suitable magnetically attractive material, and which are attached to the bottom plate 120 via an adhesive. By way of example, the disks may be formed from stainless steel having a thickness between about 0.15 mm and about 0.2 mm, and a diameter between about 4 mm and about 7 mm. In addition, the adhesive may be #467 manufactured by 3M Corporation. It should be noted that the above mentioned parameters are not a limitation and that the size and type of materials used may vary according to the specific needs of each device. It should also be noted that the metallic surface is not limited to a circular shape (i.e., disk) and that the shape may be formed from almost any geometric configuration. For example, the metallic surface may have an oval shape, a rectangular shape, a triangular shape, or the like.

Moreover, the magnets are generally permanent magnets that are about the same size and produce about the same magnetic flux. However, having the same size and magnetic flux is not a limitation, and in some configurations it may be desirable to have magnets with different magnetic fluxes and sizes. By way of example, a first flux may be suitable for holding down the edges of the keyboard while a second flux may be suitable for holding down the center of the keyboard. In most cases, the diameter and height of the magnet are limited because of the space requirements of the portable computer. By way of example, a magnet having a height of about 1 mm and a diameter of about 4 mm may be used. Further, like the metallic surface, the magnets are not limited to a circular or cylindrical shape and thus they may be formed from almost any geometric configuration.

As shown, the magnets 152 are disposed inside a hole 180 in the upper portion 174 of the rib 128. In one implementation, the magnets 152 are press fit into the hole 180. In other implementations, the magnets are attached via screws or adhesive. The top surfaces 181 of the magnets 152 generally lie flush or below the top surface 182 of the upper portion 174 (e.g., countersunk). Furthermore, a gap 186 is typically formed between the magnetic surface 154 and the magnet 152 to soak up keyboard tolerances, i.e., the keyboard may be slightly warped. In general, the closer the magnets 152 are to the surfaces 154, the greater the intensity of the magnetic field produced therebetween. If the distance is large, a larger magnet may be needed to get the desired magnetic field. The gap 186 is generally set between about 0 mm (contact) and about 1 mm, and more particularly between about 0.25 mm and about 0.3 mm. As should be appreciated, the magnet 152 and the surface 154 connect magnetically even when they do not touch. In most situations, the magnetic force causes the base plate 120 to press against the lip 131 and/or the ribs 128 thereby preventing the surface 154 and the magnet 152 from touching. It should be understood that the size of the gap may vary according to the specific design of each device. It should also be noted that a gap is not a limitation and that the magnets and metallic surfaces may be configured to contact one another.

FIG. 5 is a side elevation view of the base 102 and the keyboard 106 (taken along 5–5' as indicated in FIG. 3), in accordance with one embodiment of the invention. As shown, the keyboard 106 is positioned within the opening 125 of the base 102. As such, the magnet 152 and the surface 154 work together to hold the outer edge 170 of the bottom plate 120 against the recessed lip 131 of the base 102. In this embodiment, the magnet 152 is integrated with a screw 190 that is used to secure the modem 160 to the base 102. As shown, the screw 190 is fixedly attached to the base 102 via a modem through hole 191. The screw 190 generally includes a cup top portion 192. The magnet 152 is fixed inside the cup top portion 192 such that the top surface 194 of the magnet 152 is substantially flush with the top surface 196 of the cup top portion 192. In one implementation, the magnet 152 is press fit into the cup top portion 192. Furthermore, the metallic surface 154 is attached to the bottom surface 178 of the bottom plate 120 and disposed over the magnet 152. As such, the bottom plate 120 is drawn towards the modem 160 via the magnet/metallic surface combination when the keyboard 106 is placed in the opening 125 of the base 102. As should be appreciated, the magnetic drawing action not only holds the base plate 120, but it also prevents upward deflections of the base plate 120.

FIG. 6 is a bottom view diagram of the keyboard 106, in accordance with one embodiment of the invention. As shown, the plurality of surfaces 154 are attached to the bottom surface 170 of the bottom plate 120. Each of the surfaces 154 is configured to have a corresponding magnet (not shown in this figure). For example, a first disk 154A generally corresponds to the magnet 152A, second and third disks 154B and 154C generally correspond to second and third magnets 152B and 152C, fourth and fifth disks 154D and 154E generally correspond to fourth and fifth magnets 152D and 152E, a sixth disk 154F generally corresponds to sixth magnet 152F, a seventh disk 154G generally corresponds to seventh magnet 152G, and an eighth disk 154H generally corresponds to eighth magnet 152H.

In an alternate embodiment, and referring back to FIG. 2, the movable keyboard 106 may include a mechanical keyboard securing system to help secure the movable keyboard 106 to the base 102. In this embodiment, the mechanical keyboard securing system includes a plurality of hooks 202 and a plurality of latches 204. The hooks 202 are configured for engaging a first portion 206 of the base 102, and the latches 204 are configured for engaging a second portion 208 of the base 102. As should be appreciated, when the hooks and latches are engaged with their respective portions of the base 102, they help secure the movable keyboard 106 to the base 102. In one implementation, the hooks 202 and latches 204 are received by slots (not shown) positioned within the inner peripheral surface 127 of the opening 125. The shape of the slots typically coincide with the shape of the hooks 202 and latches 204. As should be appreciated, the hook, latch and slot combination helps to keep the movable keyboard 106 substantially level, especially the edges, when the movable keyboard 202 is disposed in the opening 125 of the base 102. Further, the hooks and the latches may be configured as load bearing members that help support the movable keyboard 106 in the opening 125 of the base 102 against loads such as a user typing on the movable keyboard 106.

In one implementation, the latches 204 may be mechanical latches that are movably coupled to the movable keyboard 106 in order to engage and disengage the slots. For example, the latches 204 may be configured to move between a first position and a second position. In the first position, the movable keyboard 106 is secured in place as the latches 204 couple to the base 102. In the second position, the movable keyboard 106 becomes movable (or removable) as the latches 204 disengage from the base 102. As such, the movable keyboard 106 may be positioned in the base 102 by inserting the hooks 202 of the movable keyboard 106 into the slots of the base 102. Thereafter, the other side of the movable keyboard 106 may be lowered into position, while the latches 204 are retracted to the first position. Once the movable keyboard 106 is in position, for example when the movable keyboard 106 is held under the magnetic force of the magnetic keyboard securing system, the latches 204 are released to return to the second position and thus into the slots of the base 102. To open the user depresses the latches 204 and once retracted, the moveable keyboard 106 may be removed (after applying a removal force against the holding force of the magnetic keyboard securing system).

In another embodiment, a lock arrangement suitable for locking the movable keyboard to the base may be provided. The lock arrangement operates to lock the movable keyboard to prevent immediate and unwanted access to the internal components of the portable computer. In one implementation, the lock arrangement includes a locking member that is movably coupled to the base. The locking member is arranged to move between a first position and a second position relative to the base so as to engage a portion of the movable keyboard. In this manner, the movable keyboard can be locked or unlocked by moving the locking member. In one implementation, the locking member may include a key head for accepting a removable key, and for actuating the movement of the locking member.

By way of example, a mechanical keyboard securing system and a lock arrangement, which may be used in the portable computer 100 for securing and locking the keyboard to the base, may be found in U.S. patent application Ser. No. 09/405,552, filed on Sep. 24, 1999, which is herein incorporated by reference.

As can be seen from the foregoing, the advantages of the invention are numerous. Different embodiments or implementations may have one or more of the following advantages. One advantage of the invention is that the movable keyboard provides access to the internal components of a computer. For example, the computer user is able to easily access internal components, such as hard drive, modem, memory and processor board, for upgrades and repairs. Another advantage of the invention is that the outer peripheral surfaces of the computer housing are saved for design purposes. That is, the movable keyboard implementation is extremely subtle and therefore enhances the industrial design qualities of the product. By way of example, the movable keyboard provides a secret door without producing unwanted industrial design surfaces (i.e., trap doors). Yet another advantage of the invention is that the magnetic keyboard securing system provides a firm and strong "feel" that substantially resembles the feel of a desktop keyboard. That is, the magnets and the metallic surfaces cooperate to hold the keyboard against the base, frame and other internal components. The magnets and metallic surfaces also work together to prevent forces from bowing the keyboard upwards. Further, the magnetic keyboard securing system is much less cumbersome than screws, adhesive tape, support ribs, lattices, and much simpler than having multiple mechanical latches.

While this invention has been described in terms of several preferred embodiments, there are alterations, permutations, and equivalents, which fall within the scope of this invention. For example, the positions of the magnets and disks could be reversed such that the magnets are attached to the keyboard and the disks are attached to the various portions of the base. In addition, although the present invention was described as having a plurality of magnets, it should be understood that this is not a limitation and that a single magnet could be used. For example, a magnetic sheet may be used to cover the bottom surface of the base plate. Further, the magnets could also be attached directly to the base as for example to the lip of the base. Additionally, the metallic disks could be replaced by a bottom plate that is magnetically attracted to the magnets. By way of example, a ferrous bottom plate may be used. Moreover, although the magnets were described as being permanent magnets, it should be understood that this is not a limitation and that electromagnets may also be used. It should also be noted that there are many alternative ways of implementing the methods and apparatuses of the present invention. For example, although the magnets were described as being attached to the ribs, the modem and the heat sink, they could also be attached to other components disposed inside the base. It is therefore intended that the following appended claims be interpreted as including all such alterations, permutations, and equivalents as fall within the true spirit and scope of the present invention.

What is claimed is:

1. A computer comprising:
   a housing;
   a keyboard that is detachable from the housing; and
   a magnetic keyboard securing system for holding the keyboard relative to the housing.

2. The computer as recited in claim 1 wherein the housing includes an opening for allowing access to a computer component that is enclosed in the housing.

3. The computer as recited in claim 2 wherein the opening is disposed in a top surface of the housing.

4. The computer as recited in claim 3 wherein the keyboard is configured to cover the opening.

5. The computer as recited in claim 3 wherein the keyboard is configured for placement within the opening of the housing, and wherein the magnetic keyboard securing system is configured to hold the keyboard in the opening of the housing when the keyboard is placed in the opening of the housing.

6. The computer as recited in claim 5 wherein the keyboard includes a bottom plate, and wherein the housing includes a lip for supporting the bottom plate when the keyboard is placed in the opening of the housing.

7. The computer as recited in claim 6 wherein an inner peripheral surface of the opening is substantially flush with an outer peripheral surface of the bottom plate when the keyboard is placed in the opening of the housing.

8. The computer as recited in claim 5 wherein the magnetic keyboard securing system includes a magnetic element and a magnetic surface that cooperate to hold the keyboard in the opening of the housing when the keyboard is placed in the opening of the housing.

9. The computer as recited in claim 8 wherein the magnetic element is directly or indirectly attached to the housing, and wherein the magnetic surface is attached to the bottom plate.

10. The computer as recited in claim 9 wherein the magnetic element is attached to a frame member that supports the housing.

11. The computer as recited in claim 10 wherein the frame member includes an upper portion that extends proximate a bottom surface of the bottom plate, the upper portion being arranged for preventing the bottom plate from bowing when the keyboard is placed in the opening of the housing.

12. The computer as recited in claim 9 wherein the magnetic element is attached to a screw that is fixed to the housing.

13. The computer as recited in claim 9 wherein the magnetic element is attached to a bar that is fixed to a frame member that supports the housing.

14. The computer as recited in claim 8 wherein the magnetic element is a permanent magnet, and wherein the magnetic surface is a metal plate.

15. The computer as recited in claim 8 wherein a gap is provided between the magnetic element and the magnetic surface when the keyboard is placed in the opening of the housing.

16. The computer as recited in claim 8 wherein a plurality of magnetic elements and a plurality of magnetic surfaces are used to hold the keyboard relative to the housing.

17. The computer as recited in claim 8 wherein the magnetic surface is directly or indirectly attached to the housing, and wherein the magnetic element is attached to the bottom plate.

18. The computer as recited in claim 8 wherein the magnetic surface is a portion of the bottom plate, and wherein the magnetic element is directly or indirectly attached to the housing.

19. The computer as recited in claim 1 wherein the magnetic keyboard securing system holds the keyboard in such a way that when the keyboard is used by a user, the typing "feel" of the keyboard substantially resembles the feel of a desktop computer keyboard.

20. The computer as recited in claim 1 wherein the magnetic keyboard securing system holds the keyboard to prevent bowing of the keyboard during use.

21. The computer as recited in claim 1 wherein the computer is a portable computer having a base and a lid, and wherein the housing is the base.

22. The computer as recited in claim 21 wherein the magnetic element is directly or indirectly attached to the housing, and wherein the magnetic surface is directly or indirectly attached to the keyboard.

23. The computer as recited in claim 1 wherein the magnetic keyboard securing system includes a magnetic element and a magnetic surface that cooperate to hold the keyboard relative to the housing.

24. The computer as recited in claim 1 further including a mechanical keyboard securing system coupled to the keyboard, the mechanical keyboard securing mechanism being arranged to secure the keyboard to the housing.

25. The computer as recited in claim 1 further including a lock coupled to the housing and configured to lock the keyboard to the housing such that the keyboard is prevented from being detached from the housing.

26. A computer comprising:
   a housing;
   a keyboard that is movable relative to the housing; and
   a means for magnetically attaching the keyboard to the housing.

27. A portable computer, comprising:
   a base having an opening for allowing access to a component enclosed within the base;
   a removable keyboard having a base plate configured for placement within the opening;
   a permanent magnet fixedly coupled to either the base or a structural component enclosed within the base; and
   a metal disk fixedly coupled to the base plate;
   wherein the magnetic element and the magnetic surface are cooperatively positioned so that when the removable keyboard is placed within the opening, the permanent magnet and metal disk are magnetically attracted to one another thus securing the removable keyboard to the base.

28. A method for holding a removable keyboard within an opening disposed in a base of a portable computer, the method comprising:
   providing a magnetic element and a magnetic surface; and
   magnetically attracting the magnetic surface towards the magnetic element so as to magnetically secure the keyboard within the opening of the base.

* * * * *